(12) United States Patent
Cola

(10) Patent No.: US 8,608,013 B2
(45) Date of Patent: Dec. 17, 2013

(54) GAS CYLINDER

(75) Inventor: Gian Luigi Cola, Venice (IT)

(73) Assignee: Faber Industrie S.p.A., Udine (IT)

( * ) Notice: Subject to any disclaimer, the term of this patent is extended or adjusted under 35 U.S.C. 154(b) by 0 days.

(21) Appl. No.: 13/496,969

(22) PCT Filed: Sep. 22, 2009

(86) PCT No.: PCT/IT2009/000430
§ 371 (c)(1),
(2), (4) Date: Apr. 20, 2012

(87) PCT Pub. No.: WO2011/036681
PCT Pub. Date: Mar. 31, 2011

(65) Prior Publication Data
US 2012/0193244 A1    Aug. 2, 2012

(51) Int. Cl.
*F17C 1/00*        (2006.01)

(52) U.S. Cl.
USPC .............................................. 220/581; 206/8

(58) Field of Classification Search
USPC ........ 220/581, 669, 4.14, 592, 565, 586, 590, 220/588, 589, 591; 206/0.6; 248/154, 313
See application file for complete search history.

(56) References Cited

U.S. PATENT DOCUMENTS

| | | | |
|---|---|---|---|
| 2,332,462 A | | 10/1943 | Nilson et al. |
| 4,441,678 A | * | 4/1984 | Dorpmund .................... 248/146 |
| 4,724,975 A | * | 2/1988 | Leventry ........................ 220/581 |
| 5,186,324 A | * | 2/1993 | Brandon, Jr. .................. 206/223 |
| 5,284,267 A | * | 2/1994 | Polletta et al. ............... 220/4.14 |
| 6,241,116 B1 | * | 6/2001 | Schrepfer et al. ............. 220/581 |
| 6,453,697 B1 | | 9/2002 | Harmer et al. |
| 6,460,721 B2 | * | 10/2002 | Bowen et al. .................. 220/586 |
| 6,637,457 B2 | * | 10/2003 | Evanovich et al. ........... 137/574 |
| 6,886,861 B2 | * | 5/2005 | Marsala et al. ............... 280/834 |
| 7,264,277 B2 | * | 9/2007 | Ono et al. ...................... 280/830 |
| 7,562,788 B2 | * | 7/2009 | Watanabe et al. ............. 220/562 |
| 2002/0053573 A1 | | 5/2002 | Bowen et al. |
| 2003/0189334 A1 | * | 10/2003 | Kawasaki et al. ............. 280/834 |
| 2011/0139796 A1 | * | 6/2011 | Lukiyanets et al. .......... 220/581 |

FOREIGN PATENT DOCUMENTS

AU         82383 75 A    1/1977
WO   WO 2006/111846 A2   10/2006

* cited by examiner

*Primary Examiner* — Steven A. Reynolds
(74) *Attorney, Agent, or Firm* — Dickstein Shapiro LLP

(57) ABSTRACT

A gas cylinder (1) formed of a cylinder body (2) with a tubular wall (5) having at least a first tubular portion (11) that is enlarged, and at least a second tubular portion (12) that is adjacent and narrowed relative to the first tubular portion (11).

17 Claims, 5 Drawing Sheets

GAS CYLINDER

The subject-matter of the present invention is a gas cylinder intended as a transportable container used to store pressurized gas, and provided with a valve that allows the closure thereof.

The cylinder can be completely made from metal, or it can be composed of an inner liner, for example, in steel, which is reinforced by an outer layer of fiber reinforced composite material.

Gases in the cylinders are classified in compressed gases if the critical temperature thereof is below −50° C., such as hydrogen or oxygen, in liquefied gases if the critical temperature is higher than −50° C., such as LPG, and in dissolved gases such as, for example, acetylene in acetone.

The cylinders are intended for multiple uses, and the standards for the construction and testing thereof vary according to the application. Among the main applications of gas cylinders, the storage of liquefied or compressed gases for autotraction, domestic or industrial uses, the storage of compressed or liquefied gases for industrial use, air holding tanks for compressed air, the storage of breathable mixtures for breathing apparatuses, the storage of medical gases, and fire extinguishers may be mentioned.

The gas cylinders for liquefied gas known for domestic uses are of a cylindrical shape, made of welded steel sheet, and have a handle on the upper part to facilitate the grip thereof and to protect the closure valve to which a pressure reducer has to be applied before the first connection to a domestic use. The known gas cylinder for liquefied gas has an internal space that can hold 10 Kg to 25 kg of liquefied gas which partially fills such internal space, leaving a residual space that compensates for the pressure as temperature varies.

The known gas cylinders for LPG-powered vehicles are also of a cylindrical shape and made of welded steel sheet, and usually secured in a horizontal position in the vehicle boot.

The known gas cylinders for compressed gases-powered vehicles, among which methane, hydrogen, and mixtures, are also of a cylindrical shape and generally made of seamless steel, and firmly secured to the vehicle.

The known gas cylinders for the storage of compressed gases operate at a pressure of 200 bar and above, and therefore they have to be constructively robust. They have a cylindrical body with convex or concave base and hemispherical or elliptical ogive, and a closure valve arranged on the upper part of the cylinder, and protected by a cap screwed to a threaded collar. This type of cylinder is usually made of seamless steel.

According to the structural and pressure resistance needs, the known gas cylinders can be manufactured by welding operations of steel sheets, by cold deep drawing of steel sheets, by formation starting from a tube portion in steel, or by formation starting from a steel billet. For securing the closure valve to the cylinder body, it is known to provide (by welding, or hot or cold formation) a threaded tubular neck axially extending from the cylinder upper ogive outwardly and to which it is possible to screw the closure valve.

The gas cylinders are usually locked, for example, within a vehicle or another application, through one or more clamps or brackets which at least partially embrace the cylinder cylindrical body in order to safely lock it in the expected position.

The securing brackets are, in turn, arranged and anchored within a special cylinder compartment of the vehicle or the application in general, and determinate a more or less large and unused interspace between the gas cylinder and such compartment.

Furthermore, in many uses, the space available to accommodate the gas cylinders has an irregular shape, for example, approximately trapezoidal rather than rectangular, and can be interrupted by further functional elements, for example, tubes or reinforcement props, of the use itself. Even in these conditions it is desirable to reduce the available, but unused, spaces in order to store gas.

The object of the present invention is to provide a gas cylinder of the type specified before, having such characteristics as to better exploit the space that is available within the cylinder compartments for the storage of gas and therefore, with particular reference to gas-traction vehicles, to increase the traction autonomy, while keeping the overall dimensions constant.

This and other objects are achieved by a gas cylinder comprising a cylinder body internally defining a gas storing space that is closable by a closure valve, in which said cylinder body comprises a tubular wall extending along a longitudinal axis, a bottom wall defining the gas storing space on a cylinder lower side, and an upper wall defining the gas storing space on an upper side opposite the lower side, as well as a threaded tubular neck, formed at the cylinder body so as to be able to receive the closure valve in communication with the gas storing space, in which the tubular wall comprises at least a first enlarged tubular portion and at least a second tubular portion that is adjacent and narrowed relative to the first tubular portion.

Thanks to the enlarged tubular portion adjacent to the narrowed tubular portion, it is possible to adapt the overall dimensions of the gas cylinders to irregular-shaped spaces, and to receive locking clamps or brackets in an outer circumferential seat formed by the narrowed tubular portion, and to exploit the zones that are adjacent to the locking brackets for the gas storage.

In accordance with an aspect of the invention, the tubular wall containing such enlarged and narrowed tubular portions is formed in a single piece of seamless steel, the thickness thereof is formed by a single layer, with the exception of optional paint layers, which are optionally applied on the tubular wall outer or inner surface.

This facilitates the cylinder suitability testing and increases the tubular wall resistance in the transition areas between the enlarged portions and the narrowed portions, and therefore allows limiting the thickness of the wall itself.

In accordance with a further aspect of the present invention, the narrowed portions form a plurality of preferably two annular narrowings, each of which is defined on both sides by corresponding enlarged tubular portions 11.

This particular configuration of the cylinder allows a correct positioning of the locking clamps and prevents an accidental withdrawal thereof in the longitudinal direction of the gas cylinder.

In order to better understand the present invention and appreciate the advantages thereof, some exemplary, non-limiting embodiments thereof will be described herein below, with reference to the Figures, in which.

Figure 9:
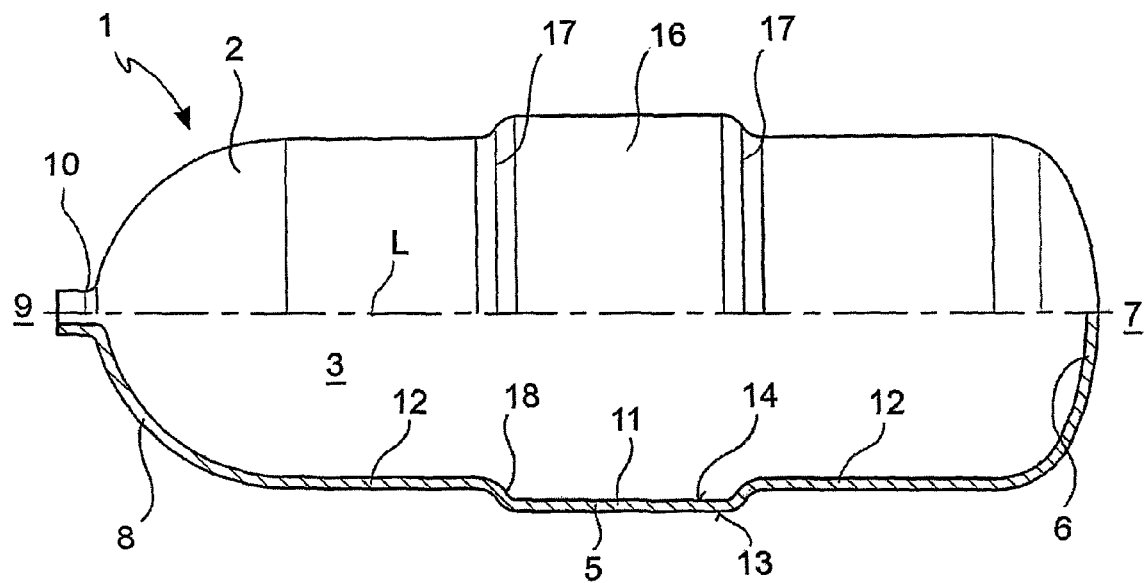
Figure 4A:
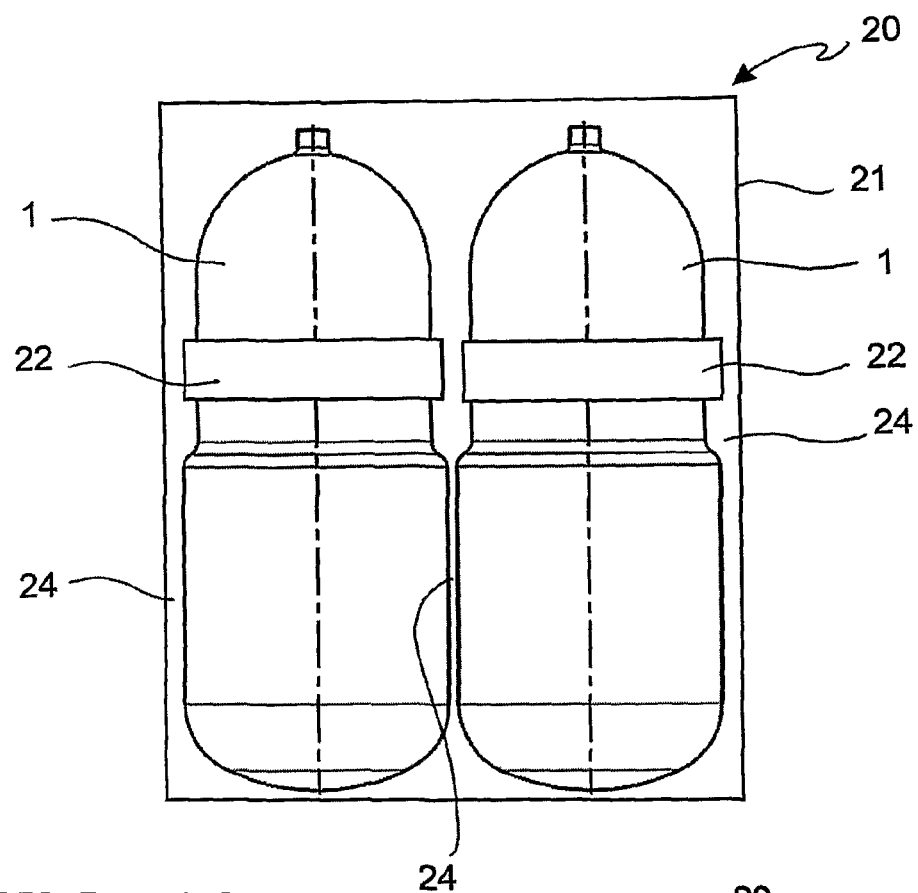
Figure 4B:
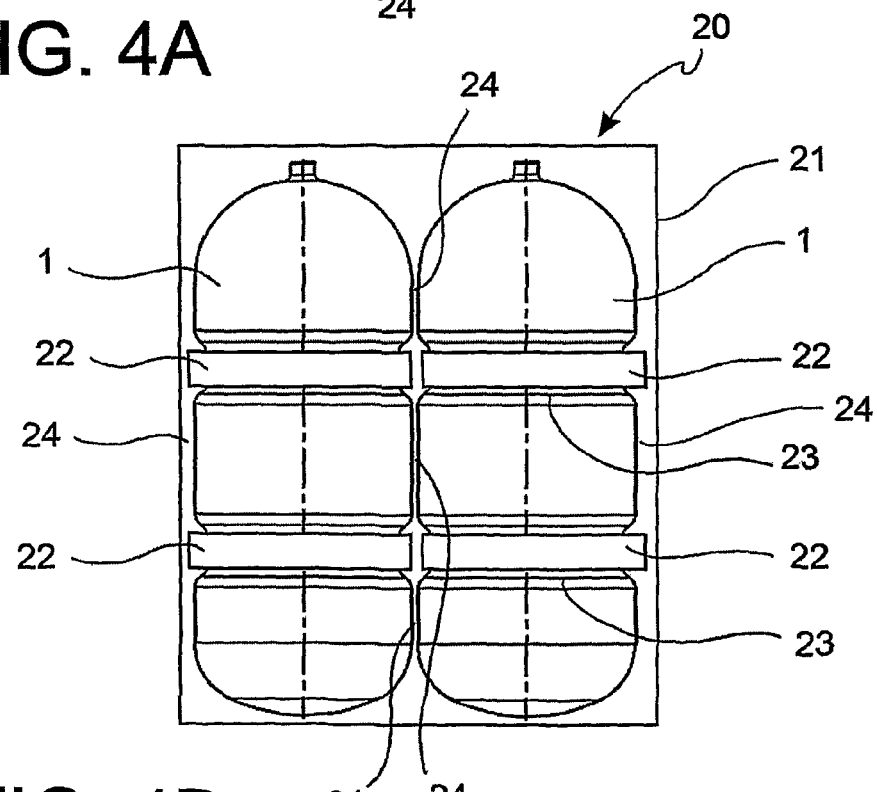
Figure 5:
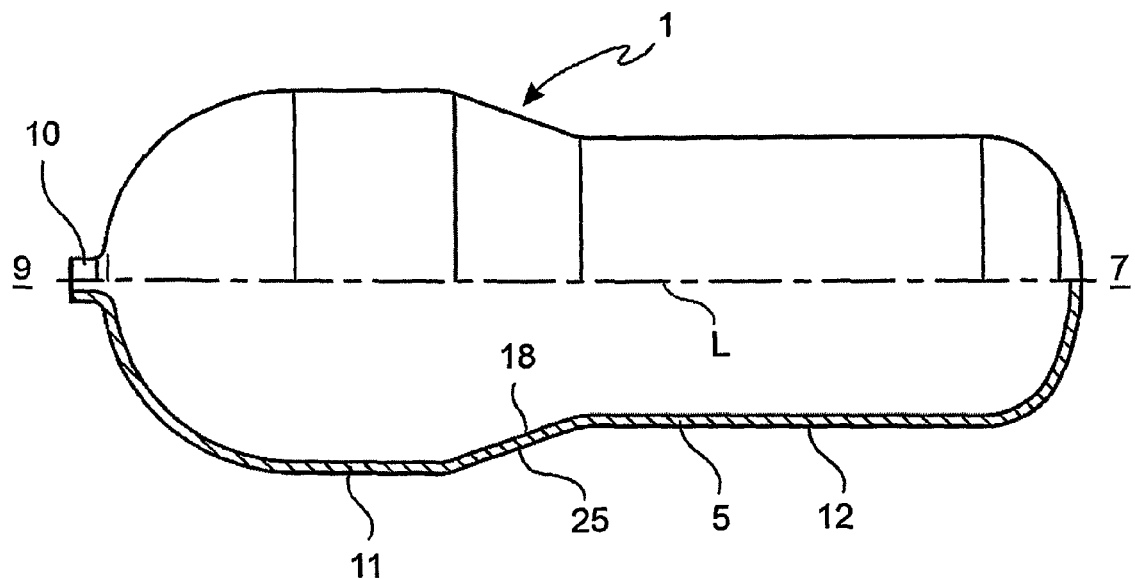
Figure 6:
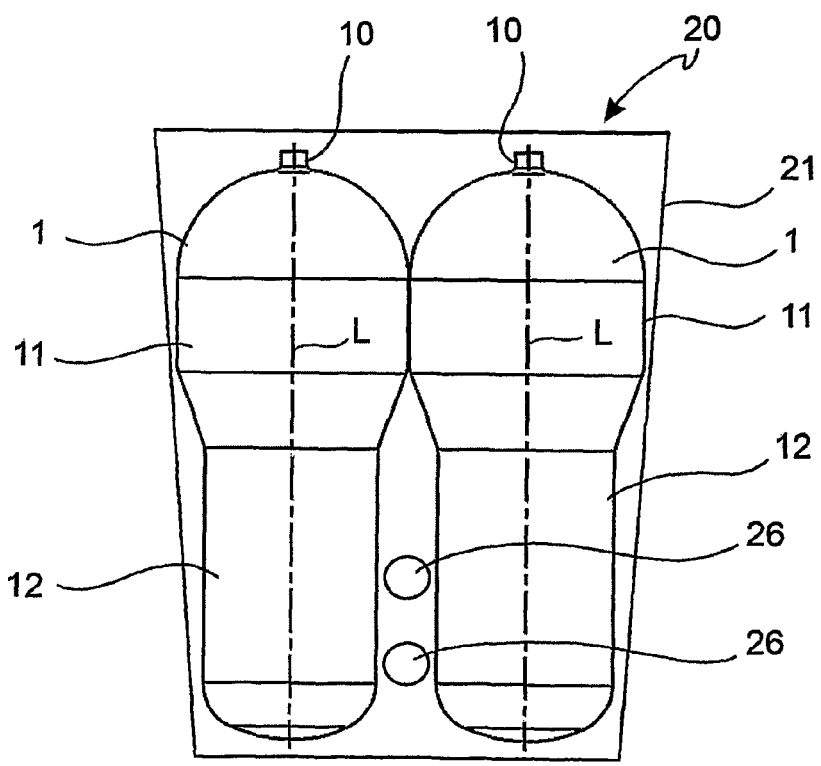
Figure 7:
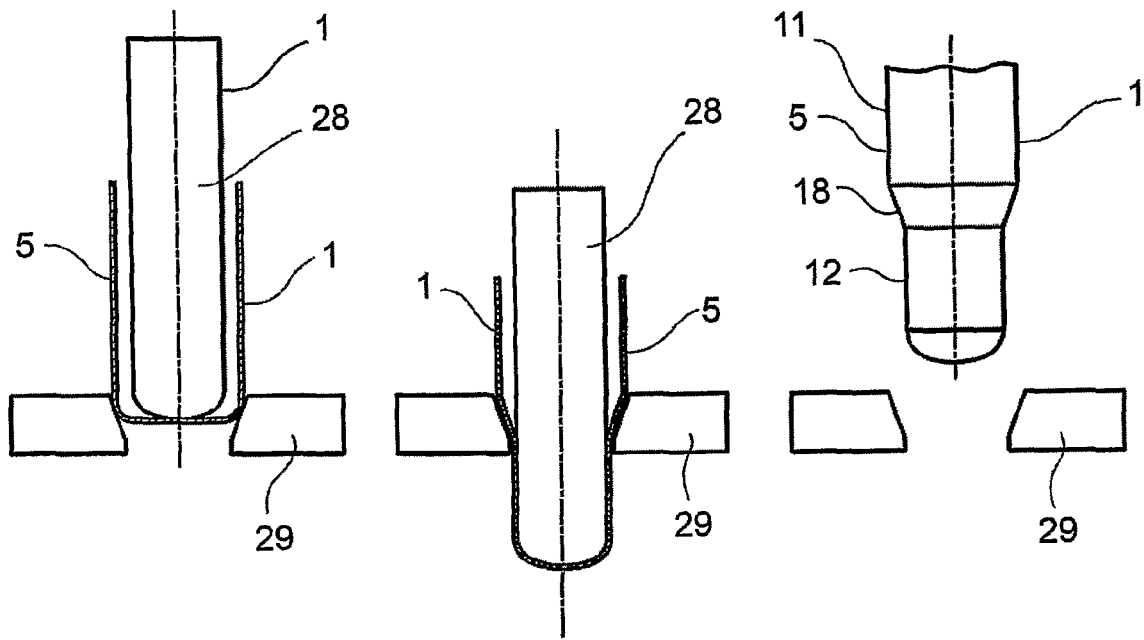
Figure 8:
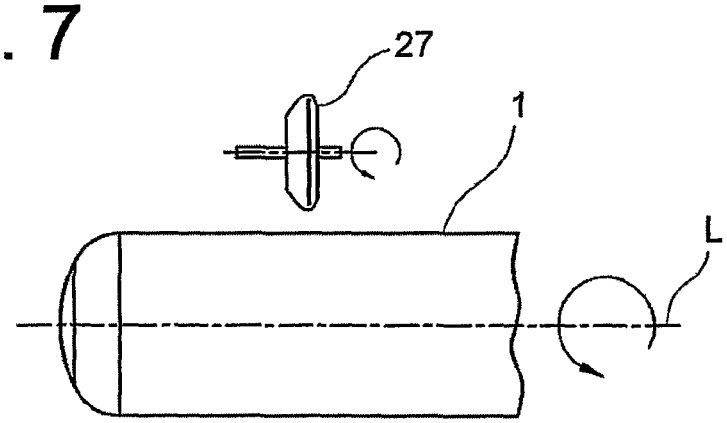
Figure 8:
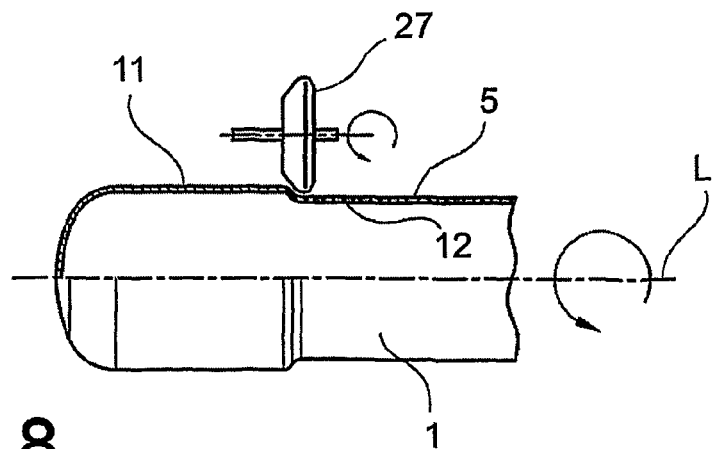

FIGS. 4A and 4B schematically illustrate cylinder compartment-gas cylinder assemblies according to embodiments of the invention;

FIG. 5 is a side view, with partial longitudinal section of a gas cylinder according to a further embodiment of the invention;

FIG. 6 schematically illustrates a further cylinder compartment-gas cylinder assembly according to the invention;

FIGS. 7 and 8 schematically illustrate methods for the fabrication of a gas cylinder according to embodiments of the invention;

FIG. 9 is a side view, with partial longitudinal section of a gas cylinder according to a further embodiment of the invention;

With reference to the Figures, a gas cylinder (hereinafter the "cylinder") is generally indicated with the numeral reference 1. The cylinder 1 comprises a cylinder body 2 internally defining a gas storing space 3 that is closable by a closure valve (not indicated in the Figures). The cylinder body 2 comprises a tubular wall 5, preferably substantially cylindrical, and extending along a longitudinal axis L of the cylinder 1, a bottom wall 6, for example, in the shape of a spherical or elliptical cap, connecting to a tubular wall 5 lower end and defines the gas storing space 3 on a cylinder 1 lower side 7, as well as an upper wall 8, for example, in the shape of an ogive, connecting to a tubular wall 5 upper end and defines the gas storing space 3 on an upper side 9 of the cylinder 1 opposite the lower side 7. The cylinder 1 further comprises a threaded tubular neck 10, formed at the cylinder body 2 so as to be able to receive (by screwing) the closure valve in communication with the gas storing space 3.

According to an aspect of the present invention, the tubular wall 5 comprises at least a first tubular portion 11 that is enlarged, and at least a second tubular portion 12 that is adjacent and narrowed relative to the first enlarged tubular portion 11.

Thanks to the enlarged tubular portion 11 adjacent to the narrowed tubular portion 12, it is possible to receive locking clamps or brackets in the narrowed tubular portion 12 and to exploit the zones adjacent to the locking brackets for the storage of gas.

In accordance with an aspect of the invention, the tubular wall 5 containing such enlarged 11 and narrowed 12 tubular portions is formed in a single piece of seamless steel, the thickness of which is formed by a single layer, with the exception of optional paint layers (not relevant to the aim of the mechanical resistance) optionally applied on the tubular wall 5 outer 13 or inner 14 surface.

This facilitates the cylinder suitability testing and increases the tubular wall resistance in the transition areas between the enlarged portions 11 and the narrowed portions 12, and therefore allows limiting the thickness of the wall 5 itself.

In accordance with a further aspect of the present invention (FIG. 2), the narrowed portions 12 form a plurality of preferably two annular narrowings 15, each of which is defined on both sides by corresponding enlarged tubular portions 11.

This particular configuration of the cylinder allows a correct positioning of the locking clamps and prevents an accidental withdrawal thereof in the gas cylinder 1 longitudinal direction L.

With the aim of conciliating at the best the needs of a stress of the tubular wall 5 as much as possible as a "stretched membrane", and of a non-cylindrical shape thereof, such as to exploit at the most the space that is available for the storage of gas, the narrowed portion 11 or, preferably, all the narrowed portions 11 form respectively a circular cylindrical central ring 16 having a constant diameter along the longitudinal axis L and two transition side rings 17 connecting the central ring 16 to the adjacent enlarged tubular portions 11, thus forming a circumferential step.

Figure 1:
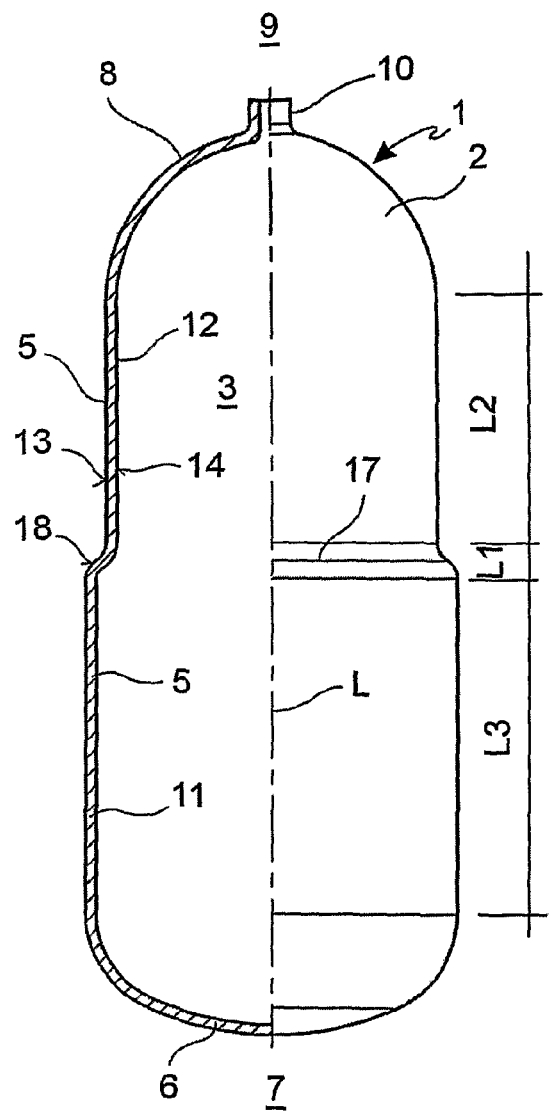
FIG. 1 is a side view, with partial longitudinal section of a gas cylinder according to an embodiment of the invention.

Advantageously, the side rings 17 have, in a longitudinal section plane which comprises the longitudinal axis L, a double curvature (FIG. 1) or a truncated cone 25 (FIG. 5) shape and a longitudinal extension L1 smaller than the longitudinal extension L2 of the cylindrical central ring 16. With the aim of reducing the bending stresses of the narrowed zones, it is advantageous to provide the central ring longitudinal extension L2 smaller than the sum of the side rings longitudinal extensions L1, that is, L2<2L1.

Also the enlarged tubular portions 11 form preferably one or more circular cylindrical rings with constant diameter along the cylinder 1 longitudinal axis L.

With the aim of maximizing the gas storing space, it can be provided that the overall longitudinal length of all the enlarged tubular portions 11 is higher than the overall longitudinal length of all the narrowed tubular portions 12, that is, $\Sigma L3 > \Sigma L1 + \Sigma L2$.

Figure 2:
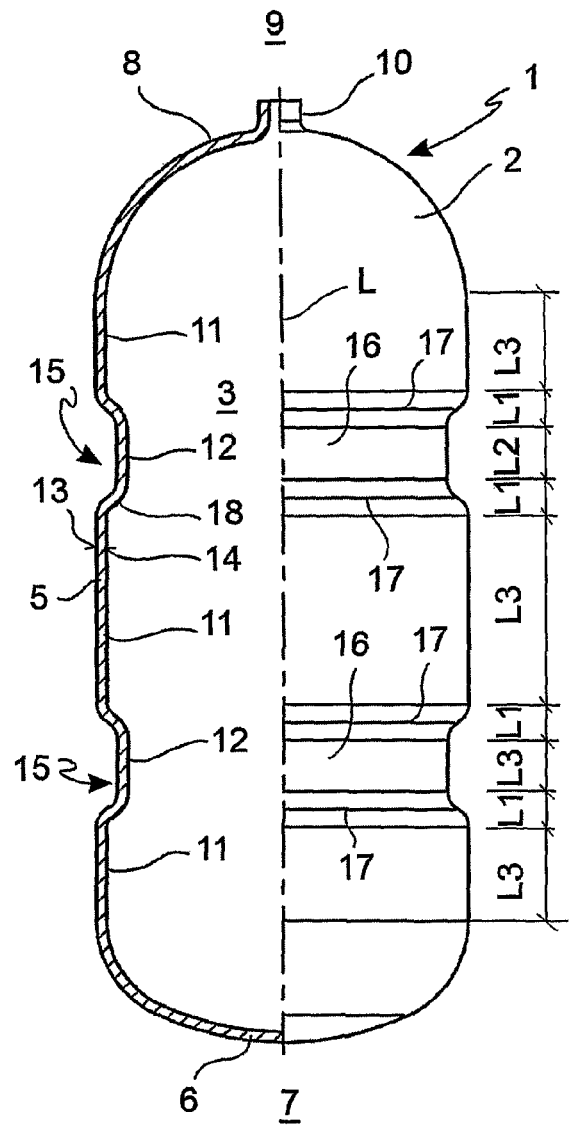
FIG. 2 is a side view, with partial longitudinal section of a gas cylinder according to a further embodiment of the invention.

In accordance with an embodiment (FIGS. 1, 5), the tubular wall 5 forms a single first enlarged portion 11 and a single second narrowed portion 12 adjacent to the enlarged portion 11 and spaced apart therefrom by a circumferential step 18 (FIG. 1) or by a frustoconical connection 25 (FIG. 5) formed by a single side ring 17 of the narrowed portion 12 that can be shaped as previously described with reference to FIG. 2.

In this manner, the gas cylinder 1 has a general step tapered shape allowing a securing thereof by one or more locking brackets in the tapered zone without leaving unused spaces in the cylinder compartment of the application, for example, of a gas-powered vehicle.

In accordance with a further aspect of the present invention (FIG. 9), two narrowed portions 12 form an upper length and a lower length of the tubular wall 5, respectively, between which an enlarged tubular portion 11 extends, forming an intermediate length, preferably substantially central, of such tubular wall 5.

As it can be seen from the Figures, the tubular wall thickness does not vary substantially, i.e., the tubular wall 5 inner surface 14 substantially follows the trend of the outer surface 13, so that the shape adaptation of the tubular wall 5 to the outer space conditions translate into a maximization of the gas storing space 3 within the cylinder 1.

Figure 3:
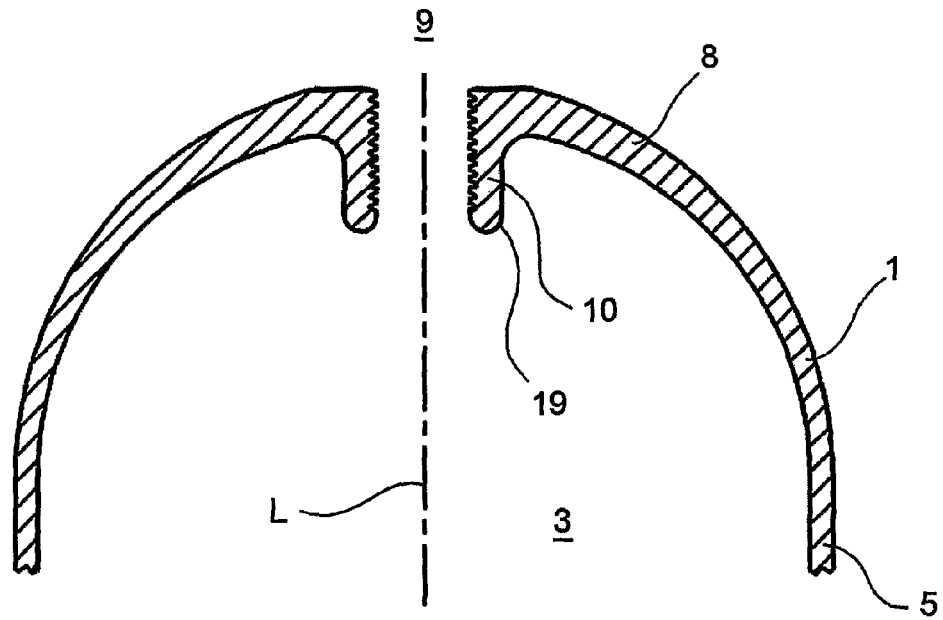
FIG. 3 is a partial view in longitudinal section of a gas cylinder according to a still further embodiment of the invention, applicable both to the gas cylinder in FIG. 1 and to the gas cylinder in FIG. 2.

According to a further aspect of the present invention (FIG. 3) that is advantageously implementable in combination with one or all of the characteristics hereto described, the gas cylinder 1 neck 10 comprises an inner portion 19, which is internally threaded and projecting inwardly in the gas storing space 3 in the cylinder body 2.

Thanks to the configuration of the threaded neck 10 at least partially projecting inwardly of the cylinder body 2, it is possible to exploit for the storage of gas also at least a part of the cylinder height that is in any case necessary for the screwing of the closure valve.

In accordance with an aspect of the invention, the neck 10 is formed in the cylinder body 2 upper wall 8 so that the gas storing space 3 forms an annular space portion 12 extending about the neck 10 inner portion 19 and defined by the inner portion 11 itself and by such upper wall 8.

In accordance with an embodiment of the invention, the neck 10 inner portion 11 is formed as a single piece with the cylinder body 2.

Alternatively, the neck 10 inner portion 19, or the whole neck 10, is manufactured separately from the cylinder body 2, and connected thereto subsequently, for example, by screwing or welding.

The present invention is advantageously applicable to all types of gas cylinders, in particular to metal gas cylinders, preferably in steel, manufactured by cold forming (for example, by deep drawing of sheet) or hot forming, starting from a steel billet (for example, by cupping and hot piercing), or by hot forming, starting from a steel tube with closure of the ends (for example, by hot spinning), or by welding, starting from one or more steel sheets.

The tubular wall 5 narrowed portions 12 can be advantageously obtained by hot or cold rolling, by the action of a forming tool 27 acting on the wall of the cylinder or the stage (the term "stage" defines the semi-finished cylinder body before ogive-shaping of the upper portion which forms the neck). To this aim, the cylinder 1 is rotated about the longitudinal axis L thereof, and the tool 27 is contacted with the tubular wall 5 and radially moved closer and at the same time moved in the longitudinal direction L so as to deform the tubular wall 5 and locally reduce the diameter thereof in the zones of the narrowed portions 12 (FIG. 8).

Alternatively (FIG. 7), it can be advantageous to draw the stage, before forming the ogive, by a punch 28 and a die 29 of a frusto-conical shape, so configured as to obtain, together, a local reduction of the tubular wall 5 diameter in the zones of the narrowed portions 12.

The neck 10 itself can be manufactured and/or connected to the cylinder body 2 by hot forming, welding, or screwing with or without successive mechanical processing.

FIGS. 4A and 4B illustrate embodiments of cylinder compartment-cylinder assemblies 20 for uses of gas, for example, vehicles. The cylinder compartment-cylinder assembly 20 comprises one or more gas cylinders 1 according to what has been described before, a support and holding structure 21 securable or formed to a bearing structure of the use (for example, of a vehicle) and configured to at least partially receive such gas cylinders, as well as one or more locking members 22, preferably locking clamps or brackets, anchored or anchorable to the support and holding structure 21 and adapted to at least partially embrace said gas cylinders in order to lock them to the support and holding structure 21. Such locking members 22 have at least a portion received in a circumferential seat 23 formed by the narrowed portion 12 in the gas cylinder 1 outer surface 13. Furthermore, at least one of the enlarged portions 11 of the gas cylinder tubular wall 5 extends in an interspace 24 (otherwise unused), defined between two locking members 22 or between a locking member 22 and the support and holding structure 21.

FIG. 6 illustrates a further cylinder compartment-cylinder assembly 20, in which the holding structure 21 comprises mutually inclined side walls, and/or interruptions due to functional members 26 (for example, tubes or reinforcing props), and the cylinder(s) 1 are adapted to the holding structure 21 shape thanks to the presence of the enlarged and narrowed portions 11, 12.

On the basis of the description and illustration of the invention hereto provided, those skilled in the art will appreciate how the gas cylinder 1 and the cylinder compartment-cylinder assembly 20 overcome the drawbacks discussed with reference to the prior art, and achieve an increase of the volume of the gas storing space 3, while keeping the overall dimensions of the cylinder compartment-gas cylinder assembly constant, in an application, e.g. vehicle use.

It shall be apparent that to the gas cylinder and the cylinder compartment-gas cylinder assembly according to the present invention, those of ordinary skill in the art, with the aim of meeting contingent, specific needs, will be able to make further modifications and variations, all of which anyhow falling within the protection scope of the invention, as defined by the following claims.

The invention claimed is:

1. A gas cylinder comprising a cylinder body internally defining a gas storing space that is closable by a closure valve, in which said cylinder body comprises:
   a tubular wall defining said gas storing space;
   a bottom wall connected to a tubular wall lower end and defining the gas storing space on a cylinder lower side;
   an upper wall connected to a tubular wall upper end and defining the gas storing space on a cylinder upper side opposite the lower side;
   wherein the tubular wall comprises at least a first tubular portion that is enlarged, and at least a second tubular portion that is adjacent and narrowed relative to the first tubular portion,
   wherein the tubular wall has a substantially constant thickness, and
   wherein the narrowed portion forms a substantially cylindrical circular central ring having a constant diameter along the longitudinal axis, and two transition side rings connect the central ring to the adjacent enlarged tubular portions, wherein the side rings form circumferential steps.

2. The gas cylinder according to claim 1, wherein the tubular wall containing said enlarged and narrowed tubular portions is formed in a single piece of seamless steel, the thickness of which is formed by a single layer, with the exception of optional paint layers.

3. The gas cylinder according to claim 1, wherein the narrowed portion forms an annular narrowing defined on both sides by corresponding extended tubular portions.

4. The gas cylinder according to claim 1, wherein the side rings have, in a longitudinal section plane comprising the longitudinal axis, a double curvature or a truncated cone shape and a longitudinal extension that is smaller than the cylindrical central ring longitudinal extension.

5. The gas cylinder according to claim 2, wherein the enlarged tubular portions form circular cylindrical rings with constant diameter along the cylinder longitudinal axis.

6. The gas cylinder according to claim 2, wherein the overall longitudinal length of all the enlarged tubular portions is greater than the overall longitudinal length of all the narrowed tubular portions.

7. The gas cylinder according to claim 2, wherein said cylinder further comprises a threaded tubular neck, formed at the cylinder body so as to be able to receive said closure valve in communication with said gas storing space, and the neck comprises an inner portion internally threaded and projecting inwardly in the gas storing space in the cylinder body.

8. The gas cylinder according to claim 7, wherein the neck is formed in the cylinder body upper wall.

9. The gas cylinder according to claim 8, wherein said gas storing space forms an annular space portion about the neck inner portion.

10. The gas cylinder according to claim 7, wherein the neck inner portion is formed as a single piece with the cylinder body.

11. The gas cylinder according to claim 7, wherein the neck inner portion is manufactured separately from the cylinder body and subsequently connected thereto.

12. The gas cylinder according to claim 1, wherein the entire cylinder body is formed in a single piece of seamless steel, the thickness of which is formed by a single layer, with the exception of optional paint layers.

13. A cylinder compartment-gas cylinder assembly, comprising one or more gas cylinders, said gas cylinder comprising a cylinder body internally defining a gas storing space that is closable by a closure valve, in which said cylinder body comprises:
a tubular wall defining said gas storing space, wherein the tubular wall has a substantially constant thickness;
a bottom wall connected to a tubular wall lower end and defining the gas storing space on a cylinder lower side;
an upper wall connected to a tubular wall upper end and defining the gas storing space on a cylinder upper side opposite the lower side;
wherein the tubular wall comprises at least a first tubular portion that is enlarged, and at least a second tubular portion that is adjacent and narrowed relative to the first tubular portion,
wherein the narrowed portion forms a substantially cylindrical circular central ring having a constant diameter along the longitudinal axis, and two transition side rings connect the central ring to the adjacent enlarged tubular portions, and
wherein the side rings form circumferential steps:
said cylinder compartment-gas cylinder assembly further comprising:
a support and holding structure securable to a bearing structure of an application, and configured to at least partially receive said gas cylinders; and
one or more locking members anchored to the support and holding structure and adapted to at least partially embrace said gas cylinders so as to lock them to the support and holding structure,
wherein said locking members are partially received in a circumferential seat of the gas cylinder formed by the narrowed portion thereof and the enlarged portion extends in an interspace between the locking member and the support and holding structure.

14. A gas cylinder comprising a cylinder body internally defining a gas storing space that is closable by a closure valve, in which said cylinder body comprises:
a tubular wall defining said gas storing space;
a bottom wall connected to a tubular wall lower end and defining the gas storing space on a cylinder lower side; and
an upper wall connected to a tubular wall upper end and defining the gas storing space on a cylinder upper side opposite the lower side;
wherein the tubular wall comprises at least a first tubular portion that is enlarged, and at least a second tubular portion that is adjacent and narrowed relative to the first tubular portion,
wherein the tubular wall has a substantially constant thickness, and
wherein the narrowed portion forms a substantially cylindrical circular central ring having a constant diameter along the longitudinal axis, and two transition side rings connect the central ring to the adjacent enlarged tubular portions, wherein the side rings further comprise a double curvature shape in a longitudinal section plane comprising the longitudinal axis, and a longitudinal extension that is smaller than the cylindrical central ring longitudinal extension.

15. The gas cylinder according to claim 14, wherein the tubular wall containing said enlarged and narrowed tubular portions is formed in a single piece of seamless steel, the thickness of which is formed by a single layer, with the exception of optional paint layers.

16. The gas cylinder according to claim 14, wherein the narrowed portion forms an annular narrowing defined on both sides by corresponding extended tubular portions.

17. The gas cylinder according to claim 16, wherein the overall longitudinal length of all the enlarged tubular portions is greater than the overall longitudinal length of all the narrowed tubular portions.

* * * * *